United States Patent
Restiau

(10) Patent No.: US 8,994,510 B2
(45) Date of Patent: Mar. 31, 2015

(54) ADAPTATION OF A TRANSMISSION BETWEEN A TERMINAL AND AN ELECTROMAGNETIC TRANSPONDER

(71) Applicant: Proton World International N.V., Zaventem (BE)

(72) Inventor: Guy Restiau, Ramillies (BE)

(73) Assignee: Proton World International N.V., Zaventem (BE)

( * ) Notice: Subject to any disclaimer, the term of this patent is extended or adjusted under 35 U.S.C. 154(b) by 113 days.

(21) Appl. No.: 13/893,050

(22) Filed: May 13, 2013

(65) Prior Publication Data

US 2013/0307674 A1      Nov. 21, 2013

(30) Foreign Application Priority Data

May 18, 2012    (FR) .................................... 12 54568

(51) Int. Cl.
| | |
|---|---|
| G06K 7/00 | (2006.01) |
| H04B 5/00 | (2006.01) |
| G06K 7/10 | (2006.01) |
| G06K 17/00 | (2006.01) |
| G01S 13/75 | (2006.01) |

(52) U.S. Cl.
CPC ............... *H04B 5/0068* (2013.01); *G06K 7/00* (2013.01); *G06K 7/10128* (2013.01); *G06K 17/00* (2013.01); *G01S 13/758* (2013.01)
USPC ....................... 340/10.4; 340/10.1; 340/572.4

(58) Field of Classification Search
USPC ...................................... 340/10.1, 10.4, 572.4
See application file for complete search history.

(56) References Cited

U.S. PATENT DOCUMENTS

| | | | | |
|---|---|---|---|---|
| 6,617,962 | B1 * | 9/2003 | Horwitz et al. | ............... 340/10.4 |
| 7,046,121 | B2 * | 5/2006 | Wuidart | ........................ 340/10.1 |
| 2007/0236336 | A1 * | 10/2007 | Borcherding | ............... 340/10.34 |
| 2009/0251291 | A1 * | 10/2009 | Borcherding | ................ 340/10.1 |
| 2010/0259390 | A1 | 10/2010 | Borcherding | |

FOREIGN PATENT DOCUMENTS

DE          102009045186 A1      4/2011

OTHER PUBLICATIONS

French Search Report and Written Opinion dated Nov. 29, 2012 from corresponding French Application No. 12/54568.

\* cited by examiner

*Primary Examiner* — Andrew Bee
(74) *Attorney, Agent, or Firm* — Seed IP Law Group PLLC

(57) ABSTRACT

A method for determining a transponder type to which an electromagnetic transponder in the field of a terminal belongs, wherein the type is determined based on a difference between a measured value of a piece of information representative of the current in an oscillating circuit of the terminal and a no-load value of this piece of information.

24 Claims, 2 Drawing Sheets

ADAPTATION OF A TRANSMISSION BETWEEN A TERMINAL AND AN ELECTROMAGNETIC TRANSPONDER

CROSS REFERENCE TO RELATED APPLICATIONS

This application claims the priority benefit of French patent application number 1254568, filed on May 18, 2012, which is hereby incorporated by reference to the maximum extent allowable by law.

BACKGROUND

1. Technical Field

The present disclosure generally relates to near-field communication systems and, more specifically, to the estimation of the expected power consumption of an electromagnetic transponder within the range of a field generation terminal.

2. Discussion of the Related Art

More and more portable devices (Smartphones, touch pads, etc.) are equipped with near field communication (NFC) devices.

Most often, such portable devices are capable of operating in two modes, respectively called card mode and reader mode. In card mode, the device operates as a contactless chip card to communicate with a near field communication terminal (for example, another mobile device operating in reader mode). In reader mode, the device operates as a terminal and is capable of reading contactless cards (or another device operating in card mode) like an electromagnetic transponder reader.

Electromagnetic transponder systems used in near field communications are now well known. Their operation is based on the transmission of a radio frequency radiation by the terminal or reader to communicate with, and possibly to remotely supply, a transponder present in the field of the terminal. The transponder, when it is within the range of the terminal, detects this field and communicates by modulating the load that it forms on this field. A transponder is within the range when it is capable of exploiting the field, and in particular of extracting from this field enough power for the operation of the circuits that it comprises.

The terminal and the transponder are generally tuned to a same frequency.

When the device operates in reader mode, it should most often remotely supply the transponder which is within its range and with which it wishes to communicate. Now, there are different natures of transponders, ranging from simple passive electronic tags to more complex transponders equipped with microprocessors. Further, according to the function performed by a transponder, its consumption varies.

For economical reasons (be the device operating in reader mode powered by a battery or directly by the electric power supply system), the power consumption of the readers is desired to be optimized.

It would thus be desirable to be able to adapt the power of the electromagnetic field generated by the terminal according to the expected consumption of the transponder present in front of it.

Complex systems which estimate the coupling between the oscillating circuits of the reader and of the card to adjust the power of a transmit amplifier on the reader side are now known. However, the implementation of such techniques requires multiple measurements and calculations and, most often, a communication between the two devices.

SUMMARY

An embodiment provides a simplified technique for estimating the expected power consumption of a transponder located in the field of a terminal.

An embodiment provides a solution requiring no communication from the transponder to the reader.

Thus, an embodiment provides a method for determining a transponder type to which an electromagnetic transponder in the field of a terminal belongs, wherein the type is determined based on a difference between a measured value of a piece of information representative of the current in an oscillating circuit of the terminal and a no-load value of this piece of information.

According to an embodiment, said piece of information is proportional to the voltage across a capacitive element of the oscillating circuit of the terminal.

According to an embodiment, said no-load value is stored at a time when no transponder is present in the field.

According to an embodiment, said piece of information is measured during frames periodically transmitted by the idle terminal.

Another embodiment provides a method for adapting a transmission between a terminal for generating an electromagnetic field and a transponder present in this field wherein said adaptation takes into account a transponder type determined according to the above method.

According to an embodiment, the modulation rate of a transmission carrier is adapted according to the detected transponder type.

According to an embodiment, the gain of a transmit amplifier is adapted according to the detected transponder type.

Another embodiment provides a near field read and/or write terminal, capable of implementing the above method.

The foregoing and other features and advantages will be discussed in detail in the following non-limiting description of specific embodiments in connection with the accompanying drawings.

DETAILED DESCRIPTION

Figure 1:
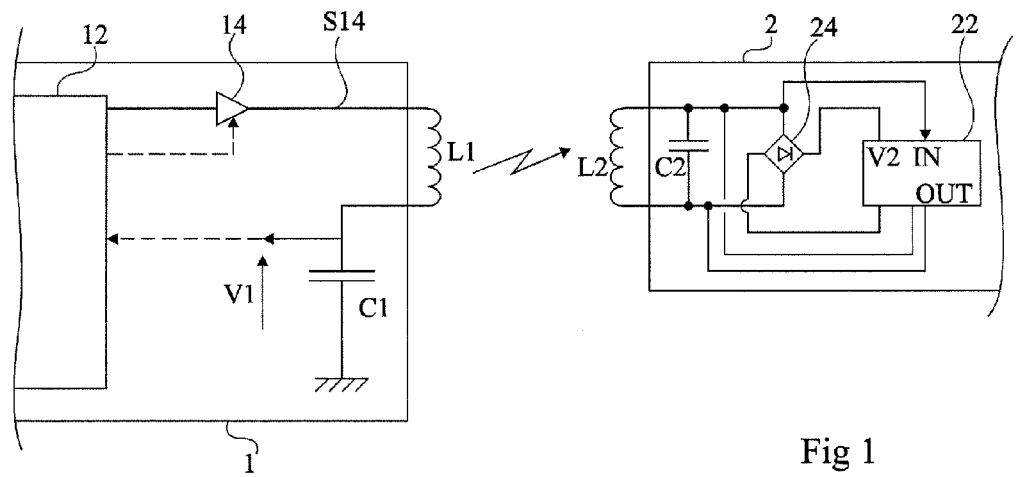
FIG. 1 is a simplified representation of a reader and of a transponder.

The same elements have been designated with the same reference numerals in the different drawings. For clarity, only those steps and elements which are useful to the understanding of the embodiments have been shown and will be described. In particular, the circuits for processing the communications and, in particular, for processing the data exchanged between a transponder and a terminal have not been detailed, the embodiments which will be described being compatible with current processing circuits.

FIG. 1 is a block diagram of a contactless communication system. This drawing shows, on the one hand, a terminal 1, generally called reader, for generating an electromagnetic field intended for transponders likely to be present in this field and, on the other hand, a transponder 2, generally called card and capable of detecting this field to establish a communication with the reader.

In an example of application to smartphone-type portable telecommunication devices, reader 1 may be formed by a smart cell phone equipped with an NFC router and the transponder may be formed of a contactless chip card. If the phone operates in card mode, it forms transponder 2 and the terminal or reader is generally formed of a fixed device of terminal type, for example, for transport ticket validation.

Reader 1 comprises various electronic circuits (identified by a block 12 in FIG. 1) for processing data to be transmitted and received, and for generating a radio frequency signal (for example, at the 13.56-MHz frequency) intended to be amplified by an amplifier 14 before driving an oscillating circuit (antenna or inductive element L1 and capacitive element C1). In the example of FIG. 1, a series oscillating circuit is assumed, inductive element L1 and capacitive element C1 being series-connected between the output of amplifier 14 and the ground. The representation of FIG. 1 is simplified on the reader side and other circuits may be present.

The oscillating circuit of reader 1 generates a high-frequency magnetic field capable of being detected by transponders 2 present in this field.

A transponder 2 generally comprises a resonant circuit, formed of an antenna or inductance L2 and of a capacitive element C2, most often in parallel. The voltage across this oscillating circuit is rectified (rectifying bridge 24) to generate a D.C. voltage V2 for supplying various circuits (symbolized by a block 22) of the transponder. In addition to this power supply voltage, the radio frequency signal, or an image thereof, is sampled towards circuits 22 (input IN), to demodulate the messages received from the terminal and interpret them. The transmission, in the transponder-to-reader direction, is performed by modulating the load formed by the transponder circuits in the electromagnetic field generated by the reader. This is generally called retromodulation (most often resistive or capacitive). This retromodulation is symbolized in FIG. 1 by an output OUT of circuit 22 connected across the oscillating circuit.

The operation of an electromagnetic transponder system is known and will not be detailed any further.

Generally, as long as no transponder has been detected in the reader field, said reader periodically transmits a polling frame. Indeed, for obvious power consumption reasons, it is not reasonable for the reader to transmit permanently.

Figure 2A:
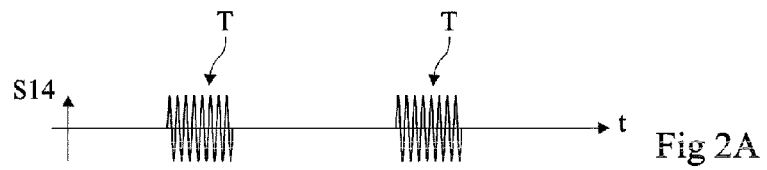
FIGS. 2A, 2B, and 2C are timing diagrams illustrating the operation of the system of FIG. 1 in a phase of approach of a transponder in the field of the reader.
Figure 2B:
Figure 2C:
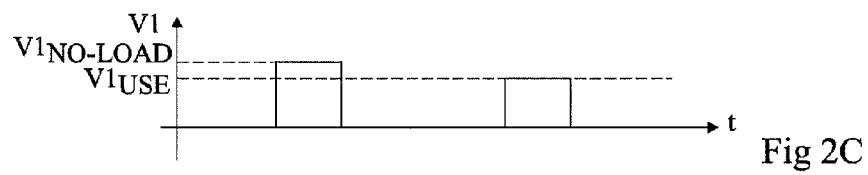

FIGS. 2A, 2B, and 2C are timing diagrams illustrating the system operation during such polling frames T. Frames T consist, for the reader, of periodically transmitting a train of halfwaves of the radio frequency carrier (for example, at 13.56 MHz) with no modulation (signal S14 at the output of amplifier 14, FIG. 2A). The frame duration is relatively short (typically on the order of from 1 to 2 microseconds).

If no transponder is present in the field (left-hand portion of the timing diagrams of FIGS. 2A to 2C), the electromagnetic field is not disturbed and voltage V1 across capacitor C1 or an image of the current in the oscillating circuit of the reader, takes a so-called no-load value $V1_{NO\text{-}LOAD}$ during frame T. The no-load value is a value corresponding to a time when no transponder is present in the field.

When a transponder is in the electromagnetic field, a voltage develops across its oscillating circuit and a voltage V2 for supplying circuits 22 is generated, as illustrated in the right-hand portion of FIG. 2B.

On the reader side, the power sampling by the transponder results in a lowering of the current in the oscillating circuit, and thus of voltage V1 down to a use value $V1_{USE}$.

This variation is detected by the reader, which can then start a communication with the transponder.

It is provided to exploit the variation of voltage V1 during such detection phases to optimize the configuration of the reader to decrease its power consumption when possible and/or to improve the quality of the transmission.

Figure 3:
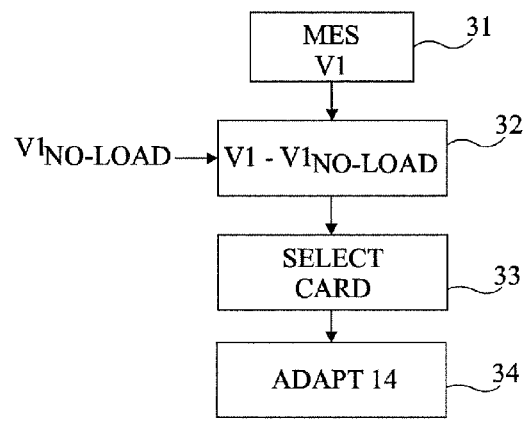
FIG. 3 is a block diagram of an embodiment of a method for adapting the power consumed by a terminal.

FIG. 3 illustrates, in the form of blocks, an embodiment of the method for adapting the reader to the type of transponder present in its field.

A first step (block 31, MES V1) comprises measuring a piece of information representative of the current in the oscillating circuit of the transponder. For example, voltage V1 across capacitive element C1 is measured. As a variation, a current sensor may be provided in series with the oscillating circuit.

This measurement is compared with the no-load value (block 32, $V1\text{-}V1_{NO\text{-}LOAD}$), for example, by calculating the difference between the two values. The no-load value is measured during the transmission of a frame T, in the absence of any transponder, and then stored.

As long as value V1 does not change, this means that no transponder is present in the field (or that a disturbance of another nature is occurring in the field). As soon as the value varies, the difference with respect to the no-load value is exploited to determine the type of card 2 present in the reader field (block 33, SELECT CARD).

As an example of embodiment, a look-up table between voltage difference δv and the type of transponder present in the field is exploited. Indeed, the present inventor has observed that according to the transponder type, a variable amount of power is drawn from the field of the reader. Further, this variation partly depends on the fact that the transponder is a passive or active transponder, but also more precisely depends on the transponder manufacturer or characteristics (contactless chip card, cell phone NFC router, etc.).

Figure 4:
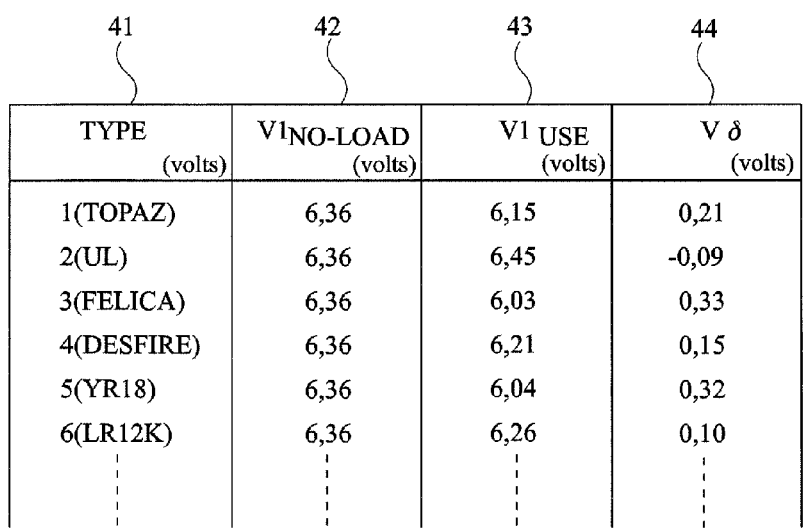
FIG. 4 illustrates an example of a table of determination of the transponder type in the field of a reader.

FIG. 4 illustrates an example of look-up table between different transponder types and their influence on the voltage difference. This drawing illustrates, in a first column 41, the transponder type (TYPE), in a second column 42, the no-load value ($V1_{NO\text{-}LOAD}$) of voltage V1, in a third column 43, the value ($V1_{USE}$) of voltage V1 in the presence of the transponder of the corresponding type, and in column 44, the voltage difference (δv).

In the example of FIG. 4, six types of transponder families have been arbitrarily identified by indicating their respective trade names in brackets (TOPAZ, UL, FELICA, DESFIRE. YR18, LR12K).

The no-load value is of course the same whatever the involved transponder type since this measurement is performed with no transponder.

According to the transponder type, the difference may be negative according to the mutual induction (for example, in the case where the inductance of the terminal is lower than that of the transponder).

In practice, knowing (and thus storing) columns 41 and 44 and the no-load value may be sufficient.

It could have been envisaged to directly compare measured value V1 with a threshold or with ranges of values to determine the family to which the transponder belongs. However, such a determination would be strongly sensitive to variations of voltage V1 due to other environmental factors. The use of difference δv enables to decrease the influence of such a variation.

To further refine the detection, the stored no-load value may optionally be modified based on current values during which it can be considered that there is no transponder. For example, a stable variation may be identified by the fact that no communication is being established.

Voltage V1 in the presence of a transponder also varies according to the distance which separates the reader from the transponder. However, at the time when a transponder comes close to the reader, said transponder is detected as soon as it enters the field (maximum distance). Accordingly, this look-up table can be established with values expected at a maximum distance between the terminal and the transponder when said transponder starts being powered, and thus sampling power from the field.

A transient variation of the environment may cause a variation letting believe that a transponder is present. Such a wrong detection already currently occurs and is not disturbing since the terminal rapidly finds out that there is no communication.

Once the transponder type has been identified, the operating voltage that it needs it is known. The transmission can then be adapted accordingly (block 34, ADAPT 14). This adaptation may take different forms. The amplification performed by amplifier 14 may be to modified. According to another embodiment, the modulation depth of the signal transmitted by the reader is varied to make its decoding by the card easier. Indeed, the modulation in the reader-to-card direction generally is an amplitude modulation with a partial modulation rate which can thus be adapted.

An advantage of the above-described transponder type determination is that it is particularly simple to perform, the information of voltage V1 already being measured in existing terminals. The implementation of the described method thus requires no structural modification in terminals and can thus be implemented in existing terminals by adapting the programs implemented by such terminals.

Another advantage is that no communication between terminal and transponder is necessary, the determination and the possible adaptation being performed on the terminal side only.

Various embodiments have been described, various alterations and modifications will occur to those skilled in the art. In particular, the practical implementation of the detection and of the adaptation is within the abilities of those skilled in the art based on the functional description given hereabove and by using circuits currently present in readers. Among possible variations, difference $V1_{NO\text{-}LOAD}-V1_{USE}$, may be calculated, another piece of information than the voltage may be measured, etc.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method, comprising:
   measuring a single value of an oscillating circuit of a terminal during a first time period, the measured single value providing an indication of current in the oscillating circuit during the first time period;
   determining a difference between the measured single value and a reference value, the reference value providing an indication of a no-load current in the oscillating circuit of the terminal; and
   determining a transponder type of a transponder in a field of the terminal based on the determined difference between the measured single value and the reference value.

2. The method of claim 1 wherein said measured single value is proportional to a voltage across a capacitive element of the oscillating circuit of the terminal during the first time period.

3. The method of claim 1, comprising:
   measuring said reference value when no transponder is present in the field.

4. The method of claim 1, comprising:
   periodically transmitting polling frames, wherein the first time period is a transmission period of a polling frame.

5. The method of claim 1, comprising:
   configuring the terminal to communicate with the transponder based on the determined transponder type.

6. The method of claim 5, comprising:
   setting a modulation rate of a transmission carrier based on the determined transponder type.

7. The method of claim 5, comprising:
   setting a gain of a transmit amplifier based on the determined transponder type.

8. The method of claim 1, comprising:
   measuring a second value of the oscillating circuit of a terminal during a second time period, the measured second value providing an indication of current in the oscillating circuit during the second time period;
   determining a difference between the measured second value and the reference value; and
   determining a transponder type of a transponder in a field of the terminal during the second time period based on the determined difference between the measured second value and the reference value.

9. An apparatus, comprising:
   an oscillating circuit; and
   transponder detection circuitry coupled to the oscillating circuit, which, in operation,
      measures a single value during a first time period, the measured single value providing an indication of current in the oscillating circuit during the first time period;
      determines a difference between the measured single value and a reference value, the reference value providing an indication of a no-load current in the oscillating circuit; and
      determines a transponder type of a transponder in a field of the apparatus based on the determined difference between the measured single value and the reference value.

10. The apparatus of claim 9 wherein said measured single value is proportional to a voltage across a capacitive element of the oscillating circuit during the first time period.

11. The apparatus of claim 9 wherein the transponder detection circuitry, in operation, measures said reference value when no transponder is present in the field.

12. The apparatus of claim 9 wherein the transponder detection circuitry, in operation, periodically transmits polling frames, and the first time period is a transmission period of a polling frame.

13. The apparatus of claim 9 wherein the transponder detection circuitry, in operation, configures the apparatus to communicate with the transponder based on the determined transponder type.

14. The apparatus of claim 13 wherein the transponder detection circuitry, in operation, sets a modulation rate of a transmission carrier based on the determined transponder type.

15. The apparatus of claim 13 wherein the transponder detection circuitry, in operation, sets a gain of a transmit amplifier based on the determined transponder type.

16. The apparatus of claim 9 wherein the transponder detection circuitry, in operation,
   measures a second value during a second time period, the measured second value providing an indication of current in the oscillating circuit during the second time period;
   determines a difference between the measured second value and the reference value; and
   determines a transponder type of a transponder in the field during the second time period based on the determined difference between the measured second value and the reference value.

17. A system, comprising:
   an oscillating circuit;
   measurement circuitry coupled to the oscillating circuit and configured to, in operation, measure a single value during a first time period, the measured single value providing an indication of current in the oscillating circuit during the first time period; and
   a controller coupled to the measurement circuitry and configured to, in operation,
      determine a difference between the measured single value and a reference value, the reference value providing an indication of a no-load current in the oscillating circuit; and
      determine a transponder type of a transponder in a field of the system based on the determined difference between the measured single value and the reference value.

18. The system of claim 17 wherein said measured single value is proportional to a voltage across a capacitive element of the oscillating circuit during the first time period.

19. The system of claim 17 wherein the controller, in operation, controls periodic transmission of polling frames, and the first time period is a transmission period of a polling frame.

20. The system of claim 17 wherein the controller, in operation, controls communication with the transponder based on the determined transponder type.

21. A non-transitory computer-readable medium whose contents configure a terminal to perform a method, the method comprising:
   measuring a single value of an oscillating circuit of the terminal during a first time period, the measured single value providing an indication of current in the oscillating circuit during the first time period;
   determining a difference between the measured single value and a reference value, the reference value providing an indication of a no-load current in the oscillating circuit of the terminal; and
   determining a transponder type of a transponder in a field of the terminal based on the determined difference between the measured single value and the reference value.

22. The non-transitory computer-readable medium of claim 21 wherein said measured single value is proportional to a voltage across a capacitive element of the oscillating circuit of the terminal during the first time period.

23. The non-transitory computer-readable medium of claim 21 wherein the method comprises:
   periodically transmitting polling frames, wherein the first time period is a transmission period of a polling frame.

24. The non-transitory computer-readable medium of claim 21 wherein the method comprises:
   configuring the terminal to communicate with the transponder based on the determined transponder type.

* * * * *